United States Patent
Russell et al.

(10) Patent No.: US 12,247,922 B2
(45) Date of Patent: Mar. 11, 2025

(54) APPARATUS, A HANDHELD ELECTRONIC DEVICE, AND A METHOD FOR CARRYING OUT RAMAN SPECTROSCOPY

(71) Applicant: OSRAM Opto Semiconductors GmbH, Regensburg (DE)

(72) Inventors: Ann Russell, San Jose, CA (US); Hubert Halbritter, Dietfurt-Toeging (DE); Christoph Goeltner, Cupertino, CA (US)

(73) Assignee: OSRAM Opto Semiconductors GmbH, Regensburg (DE)

( * ) Notice: Subject to any disclaimer, the term of this patent is extended or adjusted under 35 U.S.C. 154(b) by 297 days.

(21) Appl. No.: 17/758,549

(22) PCT Filed: Dec. 16, 2020

(86) PCT No.: PCT/EP2020/086426
§ 371 (c)(1),
(2) Date: Jul. 8, 2022

(87) PCT Pub. No.: WO2021/144107
PCT Pub. Date: Jul. 22, 2021

(65) Prior Publication Data
US 2023/0041170 A1    Feb. 9, 2023

Related U.S. Application Data

(63) Continuation of application No. 16/743,742, filed on Jan. 15, 2020, now abandoned.

(51) Int. Cl.
*G01N 21/65*    (2006.01)
(52) U.S. Cl.
CPC ....... *G01N 21/65* (2013.01); *G01N 2021/653* (2013.01); *G01N 2201/0612* (2013.01); *G01N 2201/0697* (2013.01)

(58) Field of Classification Search
CPC ...... G01N 21/65; G01N 21/658; G01N 21/31; G01N 2021/653; G01N 2201/06113;
(Continued)

(56) References Cited

U.S. PATENT DOCUMENTS 6,995,841 B2 * 2/2006 Scott ..................... G01J 3/4406
                                                      356/417
7,016,044 B2    3/2006 Murtagh et al.
(Continued)

FOREIGN PATENT DOCUMENTS

AU    2013309252 B2    6/2016
CN    202916203 U  *   5/2013
(Continued)

OTHER PUBLICATIONS

Corden, C.J. et al., "Fast Raman Spectral Mapping of Highly Fluorescing Samples by Time-Gated Spectral Multiplexed Detection," Optic Letters, vol. 43, No. 23, Dec. 2018, 4 pages.
(Continued)

*Primary Examiner* — Michael P Stafira
(74) *Attorney, Agent, or Firm* — Slater Matsil, LLP

(57) ABSTRACT

In an embodiment an apparatus includes at least one optoelectronic laser configured to provide excitation radiation to a sample, the excitation radiation being generated by an electric current flowing through the at least one optoelectronic laser, a transistor configured to modulate the electric current flowing through the at least one optoelectronic laser in order to switch on and off generation of the excitation radiation and a spectrometer configured to analyze Raman light scattered from the sample in response to exposing the sample to the excitation radiation, wherein the Raman light includes one or more spectral components, wherein the spectrometer includes a diffraction element configured to split the Raman light into the spectral components, and
(Continued)

wherein the diffraction element includes at least a photonic crystal or a plasmonic Fabry Perot filter.

21 Claims, 6 Drawing Sheets

(58) Field of Classification Search
CPC .......... G01N 21/85; G01N 2201/0221; G01N 2201/08; G01N 21/4795; G01N 21/359; G01N 21/6458; G01N 2021/656; G01N 21/39; G01N 21/17; G01N 21/6456; G01N 2015/1006; G01N 21/64; G01N 2201/12; G01N 2201/129; G01N 21/01; G01N 21/35; G01N 21/3504; G01N 21/3563; G01N 2201/062; G01N 2021/655; G01N 15/1433; G01N 21/648; G01N 21/6486; G01N 2021/6417; G01N 21/47; G01N 15/14343; G01N 21/27; G01N 33/49; G01N 15/1429; G01N 33/383; G01N 2021/3595; G01N 21/274; G01N 21/88; G01N 21/94; G01N 2201/0612; G01N 2021/3137; G01N 2021/6423; G01N 21/554; G01N 21/7746; G01N 2201/061; G01N 21/45; G01N 21/645; G01N 21/636; G01N 2021/399; G01N 21/3577; G01N 33/02; G01N 33/15; G01N 33/442; G01N 33/4833; G01N 33/54373; G01N 21/031; G01N 21/7703; G01N 2201/0697; G01N 15/1459; G01N 2021/6471; G01N 21/9508; G01N 2021/3174; G01N 15/147; G01N 21/255; G01N 21/55; G01N 21/25; G01N 2021/651; G01N 21/6408; G01N 33/025; G01N 21/75; G01N 21/654; G01N 33/50; G01N 15/1484; G01N 2015/1493; G01N 21/05; G01N 21/21; G01N 21/553; G01N 21/6428; G01N 2015/1497; G01N 21/474; G01N 2201/0627; G01N 33/48; G01N 15/0227; G01N 15/1425; G01N 15/149; G01N 2015/0294; G01N 21/0303; G01N 21/3581; G01N 2021/0346; G01N 21/774; G01N 2201/1293; G01N 27/44721; G01N 2021/6484; G01N 21/41; G01N 2201/067; G01N 2201/1296; G01N 33/56911; G01N 33/56938; G01N 21/8806; G01N 2021/1787; G01N 2021/6421; G01N 21/49; G01N 21/507; G01N 21/8592; G01N 21/33; G01N 21/59; G01N 21/63; G01N 33/2823; G01N 2021/1765; G01N 2021/7773; G01N 2201/0635; G01N 2021/6419; G01N 2030/8868; G01N 21/6454; G01N 30/88; G01N 2015/0038; G01N 2021/3513; G01N 21/53; G01N 21/76; G01N 21/78; G01N 2201/0638; G01N 2223/419; G01N 23/046; G01N 2333/11; G01N 2333/31; G01N 2333/34; G01N 31/22; G01N 33/0004; G01N 33/487; G01N 1/286; G01N 15/01; G01N 2021/258; G01N 2021/317; G01N 2021/458; G01N 2021/638; G01N 2021/7723; G01N 2021/7786; G01N 2021/8845; G01N 21/4738; G01N 21/552; G01N 21/84; G01N 2201/064; G01N 2201/068; G01N 2201/0683; G01N 2223/202; G01N 2291/0423; G01N 29/222; G01N 33/14; G01N 2015/1438; G01N 2015/1454; G01N 2015/1488; G01N 2021/157; G01N 2021/1793; G01N 2021/6439; G01N 21/251; G01N 21/3586; G01N 21/6402; G01N 21/6445; G01N 21/77; G01N 21/9501; G01N 2201/0214; G01N 2201/06
See application file for complete search history.

(56) References Cited

U.S. PATENT DOCUMENTS

| | | | |
|---|---|---|---|
| 8,310,672 B2 | 11/2012 | Schmidt et al. | |
| 8,395,770 B1* | 3/2013 | Hug | G01N 21/65 356/417 |
| 8,699,020 B1 | 4/2014 | Zhou et al. | |
| 10,488,252 B1 | 11/2019 | Vakhshoori et al. | |
| 10,660,526 B2* | 5/2020 | Islam | G01J 3/32 |
| 10,718,668 B2* | 7/2020 | Gu | G01J 3/0259 |
| 10,753,863 B1* | 8/2020 | Hug | G01J 3/2803 |
| 2006/0164635 A1* | 7/2006 | Islam | G01N 21/658 356/301 |
| 2006/0164636 A1* | 7/2006 | Islam | H01L 31/02325 257/E31.128 |
| 2008/0165356 A1 | 7/2008 | Difoggio et al. | |
| 2009/0284259 A1 | 11/2009 | Csutak | |
| 2016/0341664 A1 | 11/2016 | Rothberg et al. | |
| 2018/0196012 A1 | 7/2018 | Blanchard et al. | |
| 2019/0195688 A1 | 6/2019 | Atabaki et al. | |
| 2020/0025611 A1 | 1/2020 | Mai et al. | |
| 2020/0395521 A1 | 12/2020 | Brodoceanu et al. | |

FOREIGN PATENT DOCUMENTS

| | | | | |
|---|---|---|---|---|
| CN | 106908422 A | * | 6/2017 | |
| CN | 108700460 B | * | 11/2020 | ............ G01J 3/0208 |
| DE | 102009029648 B3 | | 3/2011 | |
| EP | 2930496 A1 | * | 10/2015 | ................ G01J 3/44 |
| WO | WO-2009137263 A2 | * | 11/2009 | ......... G02B 6/12004 |
| WO | WO-2018189737 A1 | * | 10/2018 | .............. G01J 3/433 |

OTHER PUBLICATIONS

Kostamovaara, J. et al., "Infotech Oulu Annual Report 2015—Circuits and Systems (CAS-Oulu)," Infotech Oulu Annual Report 2015—Circuits and Systems (CAS-Oulu) Infotech Oulu, University of Oulu, 2015, 31 pages.

Saha, S. et al., "Wearable SiPM-Based NIRS Interface Integrated With Pulsed Laser Source," IEEE Transactions on Biomedical Circuits and Systems, vol. 13, No. 6, Dec. 2019, 11 pages.

* cited by examiner

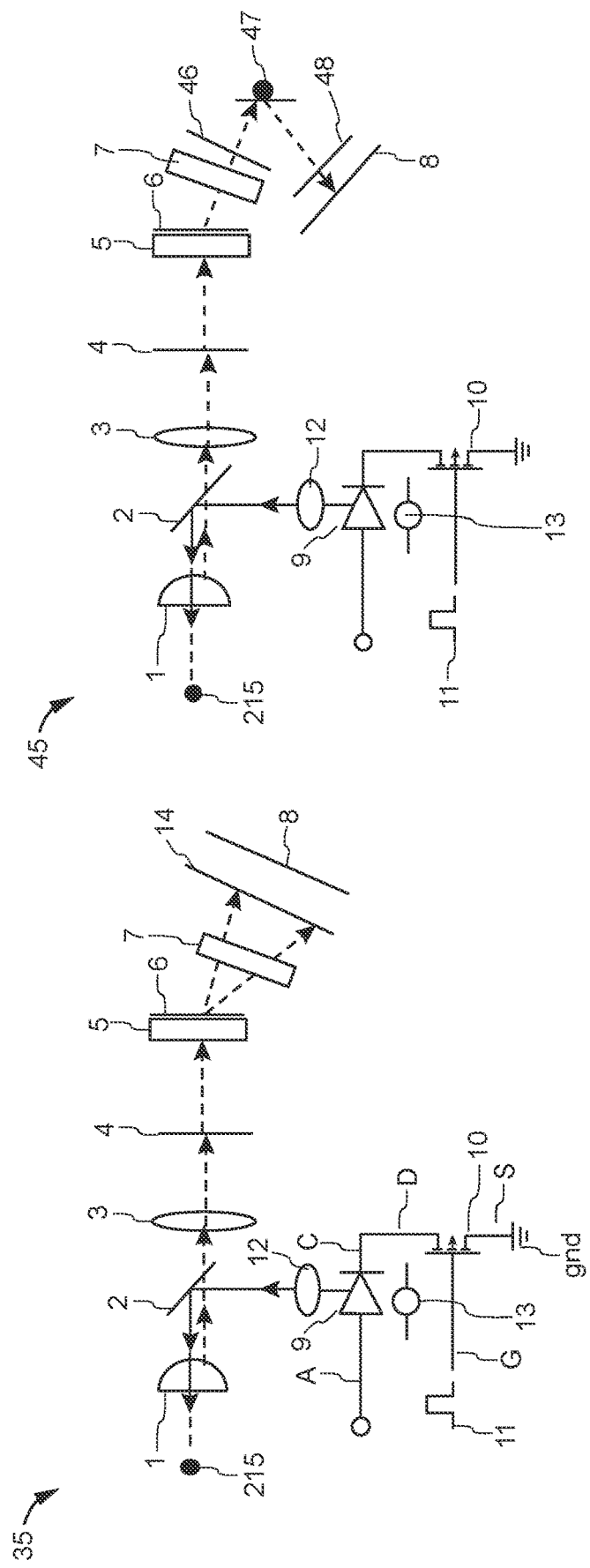

APPARATUS, A HANDHELD ELECTRONIC DEVICE, AND A METHOD FOR CARRYING OUT RAMAN SPECTROSCOPY

This patent application is a national phase filing under section 371 of PCT/EP2020/086426, filed Dec. 16, 2020, which claims the priority of U.S. patent application Ser. No. 16/743,742, filed Jan. 15, 2020, each of which is incorporated herein by reference in its entirety.

TECHNICAL FIELD

The present disclosure relates to an apparatus for carrying out Raman spectroscopy on a sample. The present disclosure relates to a handheld electronic device and a method for carrying out Raman spectroscopy on a sample.

BACKGROUND

The chemistry of samples, such as molecules, can be probed by exposing a sample to laser light and by collecting the inelastically backscattered light. Light at a wavelength of the laser light in the backscattered light, also referred to as Rayleigh scattering, can be filtered out using, for example, a high pass filter. The remaining red shifted light, also called Raman scattered light, can be imaged onto a detector. This method of probing matter is a common way to obtain a unique Raman spectrum with greater accuracy than broadband spectroscopy and it can be used to reliably identify the chemical makeup and structure of the matter in question. When examining, for example, biological media, a problem can be the occurrence of fluorescence light which can be several orders of magnitude greater than the Raman signal, and the fluorescence light can obfuscate the identifying information.

SUMMARY

Embodiments provide a repeatable, portable and affordable apparatus and method for carrying out Raman spectroscopy on a sample, for example to identify pesticides on food, drugs in urine and contamination in liquid milk.

Embodiments seek to provide an apparatus for carrying out Raman spectroscopy, such as time-gated Raman spectroscopy, on a sample. The apparatus comprises at least one optoelectronic laser for providing excitation radiation to the sample, the excitation radiation being generated by an electric current which flows through the at least one optoelectronic laser during operation of the apparatus, and a transistor, such as a GaN FET, for modulating the electric current flowing through the at least one optoelectronic laser, to thereby switch on and off the generation of the excitation radiation.

The at least one optoelectronic laser can be one or more optoelectronic lasers, and the electric currents that flow through the optoelectronic lasers can be different from each other. However, the transistor can be employed to control each of the electric currents simultaneously. The electric current through an optoelectronic laser causes the generation of coherent laser light. A GaN FET (FET=field effect transistor) allows rapid control of the electric current, and thus, it can be employed to switch on and off the generation of excitation radiation. Time gated Raman spectroscopy can therefore be carried out.

For example, the transistor can modulate the electric current such as to switch intermittently an optoelectronic laser between on operational mode and a non-operational mode. The laser can emit pulses of excitation radiation in the operational mode. The electric current is then at a level at which the pulses of excitation radiation can be generated. In the non-operational mode, the electric current is at a level where light emission does not occur.

Raman measurements on a sample will lead to fluorescence when trying to collect a Raman signal. The concept of time-gated Raman scattering is related to the aspect of collecting Raman scattering prior to fluorescence. For example, laser pulses with a time duration in the pico-second range can be used to stimulate the immediate Raman scattering prior to the fluorescing portion saturating a detector, which is used to detect the Raman light. Raman scattering of a sample is proportional to $1/\lambda^4$, wherein $\lambda$ denotes the wavelength of the excitation radiation. It can for example be possible to use direct transition 520 nm picosecond laser light to stimulate intense Raman scattering without damaging a sample.

In some embodiments, the at least one optoelectronic laser is configured to provide single mode operation which is wavelength stabilized, and/or to maintain a wavelength in a robust way and for a long time, and/or to provide excitation radiation with a long coherence length.

In some embodiments, the at least one optoelectronic laser comprises a semiconductor based lasing device, in particular a laser diode. In some embodiments, the laser diode emits green light, for example at a wavelength of 520 nm.

In some embodiments, the semiconductor based lasing device can have a DBR (=Distributed Bragg Reflector) or DFB (=Distributed feedback) or VCSEL (=vertical-cavity surface-emitting laser) architecture. Thus, for example, the optoelectronic laser can be a DBR or DFB laser diode or a VCSEL.

A distributed Bragg reflector is a periodic structure, which is formed of alternating dielectric layers having different indices of refraction. A DBR might be used to achieve nearly total reflection within a range of frequencies, wherein the range of frequencies includes the frequencies of the excitation radiation of the laser. The DBR can be formed by use of dielectric layers that are included in the layer structure of the laser.

A distributed feedback laser diode can be a type of laser diode, quantum cascade laser or optical fiber laser where the active region of the device contains a periodically structured element or diffraction grating.

A VCSEL is a type of semiconductor laser diode that emits laser light in a direction, which is perpendicular to the top surface of the laser diode.

In some embodiments, the at least one optoelectronic laser is a DFB or DBR laser diode.

In some embodiments, the at least one optoelectronic laser comprises a laser diode and at least one of an external cavity and a wavelength multiplexer.

In some embodiments, the at least one optoelectronic laser can be two, three or more lasers. For example, each laser can be a laser diode that provides laser light at a defined wavelength. The light from the laser diodes can be coupled, for example by use of a combiner, into a single fiber or into a single, preferably collimated, beam. For example, using three laser diodes, one emitting red light, one emitting green light, and one emitting blue light, a laser beam including the red, green and blue light can be obtained. Thus, an RGB laser beam could be obtained.

In some embodiments, the transistor is a Gallium Nitride field effect transistor (GaN FET). The GaN FET can be configured as a high-power GaN FET. The GaN FET can be configured to allow picosecond rise times, thereby enabling the optoelectronic laser to generate pulses with a time duration in the pico-second range.

In some embodiments, the transistor is embedded in a substrate, wherein an optoelectronic laser is arranged on the substrate. The optoelectronic laser and the transistor can be accommodated in a single package. As the transistor can be placed directly underneath the optoelectronic laser, basically none or only very short wiring is required to connect electrically the transistor to the optoelectronic laser. Thus, the transistor can be electrically coupled to the optoelectronic laser at least in substance without using bond wires. This allows short switching times of a voltage provided by use of the transistor to the optoelectronic laser. For example, a change in voltage (V) over time (t), dV/dt, can be larger than 100 V/s. For an optoelectronic laser with approximately 8V forward bias, this can for example result in a turn on and off time of 160 ps.

In some embodiments, the at least one optoelectronic laser and optionally the transistor can be arranged in a package. A connecting pad can be placed under the at least one optoelectronic laser, and the transistor can be placed on or beyond the connecting pad. The at least one optoelectronic laser in the package is preferably a DFB or DBR laser diode.

In some embodiments, the GaN FET has an electric contact and an optoelectronic laser has an electric contact, and the electric contact of the transistor is directly coupled electrically to the electric contact of the optoelectronic laser. Basically no bond wire is used to connect the electric contacts of the transistor and the optoelectronic laser.

The transistor can be an FET transistor which has a drain electrode. The optoelectronic laser can be a laser diode which has a cathode and an anode. In some embodiments, the drain of the FET transistor can be directly coupled to the cathode of the laser diode. This allows for short switching times.

In some embodiments, a driver is configured to operate the transistor such as to cause the optoelectronic laser to cause the generation of pulsed excitation radiation. The driver can provide a control signal to the transistor. The control signal can also be called frame sync signal.

For example, if the transistor is a FET transistor, the driver can provide the control signal to the gate of the transistor. The cathode of the laser diode can be connected to the drain of the FET transistor. The application of a voltage to the gate by use of the control signal allows modulating the electric current through the laser diode. Thereby, the laser diode can be rapidly switched between an on state and an off state. The control signal can for example be a square-wave signal.

In some embodiments, the at least one optoelectronic laser can be configured to generate pulsed excitation radiation, with pulses having a time duration of less than wo picosecond. The pulse duration can be measured at FWHM (=full width have maximum). The pulse duration can therefore correspond to the full width at half of the maximum of the time signal of a pulse.

In some embodiments, the at least one optoelectronic laser can be operated to generate pulses of excitation radiation, wherein each pulse has for example a time duration of less than 500 ps or less than 500 fs.

In some embodiments, the apparatus comprises a temperature sensor configured to monitor a temperature of an optoelectronic laser. A change in temperature can cause a wavelength shift in the emitted excitation radiation from the optoelectronic laser. Such a wavelength shift can thus be accounted for by monitoring the temperature.

In some embodiments, the apparatus comprises a Bragg grating.

The Bragg grating can be helpful in producing laser light with a long coherence length. The Bragg grating can be integrated into a package, which further includes the optoelectronic light source and the transistor. Such a package may have, but does not require a non-hermetic facet coating, which is preferably used in conjunction with DFB or DBR laser diodes.

In some embodiments, the apparatus comprises a spectrometer for analyzing Raman light scattered from the sample in response to exposing the sample to the excitation radiation, the Raman light comprising one or more spectral components, and wherein the spectrometer comprises a diffraction element configured to split the Raman light into its spectral components.

Thus, the diffraction element can divide the Raman light into its spectral components and thereby spread the Raman light into an optical spectrum of spatially separated wavelength components.

The spectrometer can further comprise a focusing lens system for directing at least a portion of the spectrum to a detector, such as a one- or two-dimensional array detector.

The spectrometer can comprise an entrance slit. The slit can help to tighten the window of observation for Raman scattering prior to fluorescence, thereby eliminating fluorescence, which will prevent collection of the Raman signal.

In some embodiments, the diffraction element comprises at least one of the following: a diffraction grating, a photonic crystal, and a plasmonic Fabry Perot filter.

In some embodiments, the apparatus includes a scanning mirror in a light path of the Raman scattered light, in particular between a spectrometer and a detector, wherein the transistor is operated based on a control signal, and wherein the scanning mirror is also operated based on the control signal.

Embodiments relate to a handheld electronic device which comprises a housing, and an apparatus with at least one optoelectronic laser for providing excitation radiation to the sample, the excitation radiation being generated by an electric current which flows through the at least one optoelectronic laser during operation of the apparatus, and the apparatus further comprising a transistor for modulating the electric current flowing through the at least one optoelectronic laser, to thereby switch on and off the generation of the excitation radiation and the apparatus being arranged in the housing of the handheld electronic device.

In some embodiments, the handheld electronic device is a smartphone or a tablet.

Embodiments also relate to a method of carrying out Raman spectroscopy on a sample, wherein the method comprises providing an apparatus in accordance with at least some of the embodiments as described herein, and operating the transistor, for example a GaN FET, such as to cause the optoelectronic laser to generate pulses of excitation radiation.

A feature mentioned in conjunction with an embodiment can also be present in another embodiment, even if not explicitly mentioned in conjunction with this embodiment.

The sample is not a part of the claimed apparatus, handheld electronic device or method. Rather, the sample is the piece of matter or a volume of gas or liquid on which Raman spectroscopy is carried out.

The electric current flows through the optoelectronic laser during operation of the laser and thus during the intended use of the apparatus or handheld electronic device.

In some embodiments, a handheld electronic device can comprise an apparatus for carrying out Raman spectroscopy on a sample using time gated Raman spectroscopy via direct modulation of a laser diode and MEMS mirrors plus slits to image Raman scattering prior to fluorescence as well as various instantiations using Bragg gratings (single wavelength laser) versus multiwavelengths (surface relief gratings). MEMS mirrors plus a double slits and various types of detectors (filter array, electrostatically charged deep well large pixels, Chromation device, etc.) can all provide various ways to detect separated Raman scattering. The use of double slits with a MEMS mirror prevents saturation of the Raman signal by the following fluorescence.

In some embodiments, an apparatus for carrying out Raman spectroscopy comprises a GaN FET, and a directly modulated (by the GaN FET), visible DFB or DBR laser which is used to generate laser pulses fast enough (for example <200 ps) to capture Raman scattering prior to fluorescence. Tandem slits and/or MEMS mirrors can be used to image while a laser modulation signal is used to as a frame sync. The laser modulation signal can be provided by a driver which drives the transistor based on the laser modulation signal. The use of small laser diodes, MEMS mirrors, and linear arrays as detectors can mean that the apparatus can fit into a handheld device, such as a cell phone, smart phone, tablet, etc.

BRIEF DESCRIPTION OF THE DRAWINGS

One or more examples will hereinafter be described in conjunction with the following drawing figures, where like numerals denote like elements.

FIG. 5 shows schematically a further exemplary embodiment of an apparatus;

FIG. 6 shows schematically a further exemplary embodiment of an apparatus;

DETAILED DESCRIPTION OF ILLUSTRATIVE EMBODIMENTS

Figure 1:
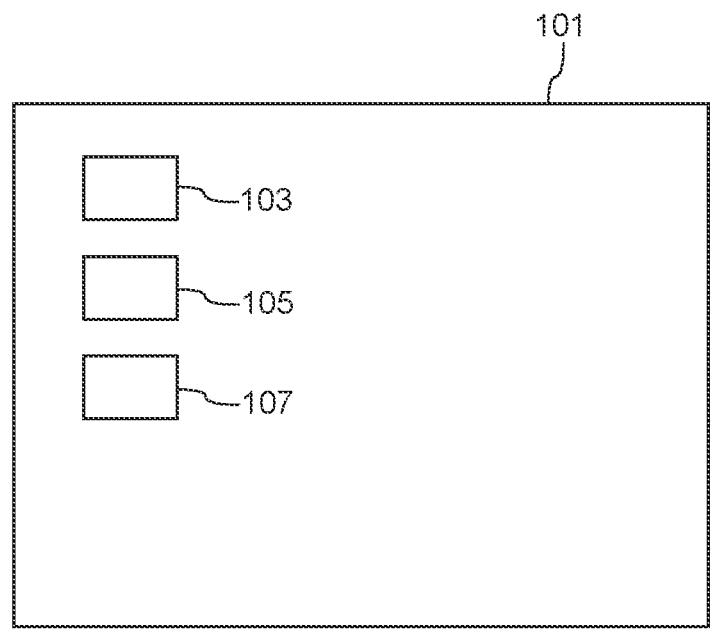
FIG. 1 shows a block diagram of an exemplary embodiment of an apparatus.

The apparatus 101 as shown in FIG. 1 can be used for carrying out Raman spectroscopy, such as time-gated Raman spectroscopy, on a sample 103, which is not part of the apparatus 101. The apparatus 101 comprises an optoelectronic laser 105 for providing excitation radiation to the sample 103. The sample 103 can be arranged, for example by a user of the apparatus, such that it can be exposed to the excitation radiation, which usually consists of or comprises laser light.

The apparatus 101 further comprises a transistor 107, for example a Gallium Nitride field effect transistor, for modulating an electric current, which flows during operation of the apparatus 101 through the optoelectronic laser 105 and which causes the generation of the excitation radiation.

Figure 2:
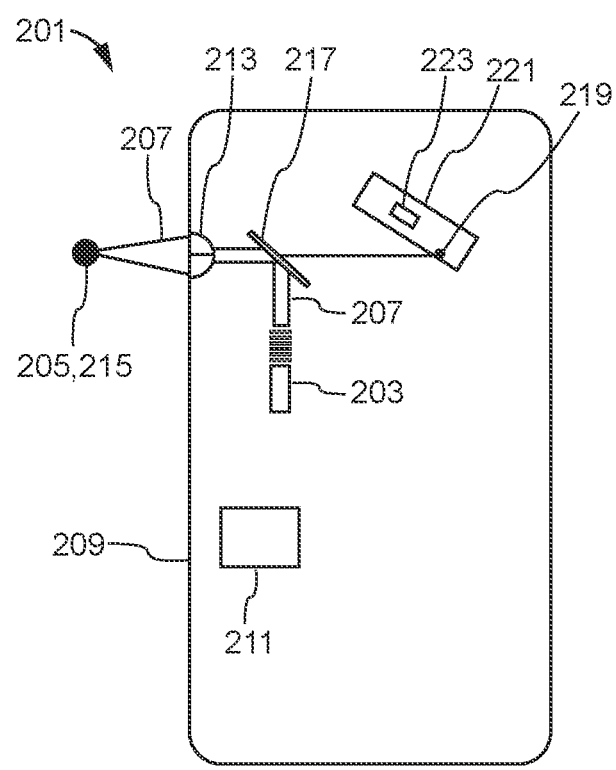
FIG. 2 shows schematically an exemplary embodiment of a handheld electronic device.

At least some embodiments of the apparatus 101 can be incorporated into a handheld electronic device, such as a cell phone, a smartphone or a tablet computer. For example, the handheld electronic device 201 of FIG. 2 comprises such an apparatus having an optoelectronic laser 203, for example a DFB or DBR laser diode, for providing excitation radiation 207 to sample 205, which is arranged outside a housing 209 of the handheld electronic device 201.

The excitation radiation 207 can have an average power of more than 100 mW. The excitation radiation can comprise green laser light, and the excitation radiation can include one or more wavelengths. For example, two wavelengths, one in the visible and one in the infrared, can help to obtain a better confirmation of the Raman signal.

The apparatus 201 also comprises a transistor 211, such as a GaN FET, for modulating an electric current, which can flow through the optoelectronic laser 203 to cause the generation of the excitation radiation 207.

The apparatus 201 also includes an objective 213, for example in form of a focusing lens system which can comprise a plano convex lens. The objective 213 can focus the excitation radiation 207 to a spot 215 outside the housing 209. The sample 207 is placed such that the spot 215 is located on the surface of the sample 205. The objective 213 also serves to collect light scattered from the sample 205. The scattered light includes Raman scattered light with wavelengths that are different from the wavelengths of the excitation radiation 207.

A high pass filter 217 is configured to reflect the excitation radiation 207 from the optoelectronic laser 203 and to guide the excitation radiation 207 to the objective 213. The high pass filter 217 is furthermore transparent for light with wavelengths, which are longer than the wavelengths of the excitation radiation 207. Thus, the red shifted portion of the Raman scattered light can pass the high pass filter 217 and it can be focused through a slit 219 of a spectrometer 221.

The spectrometer 221 comprises a diffraction element 223, such as a diffraction grating, a photonic crystal, or a plasmonic Fabry Perot filter, which spatially splits the Raman light into its spectral components. A focusing lens system (not shown) images the spectral components on an array detector, such as a CCD array detector (CCD=charged coupled device).

Figure 3:
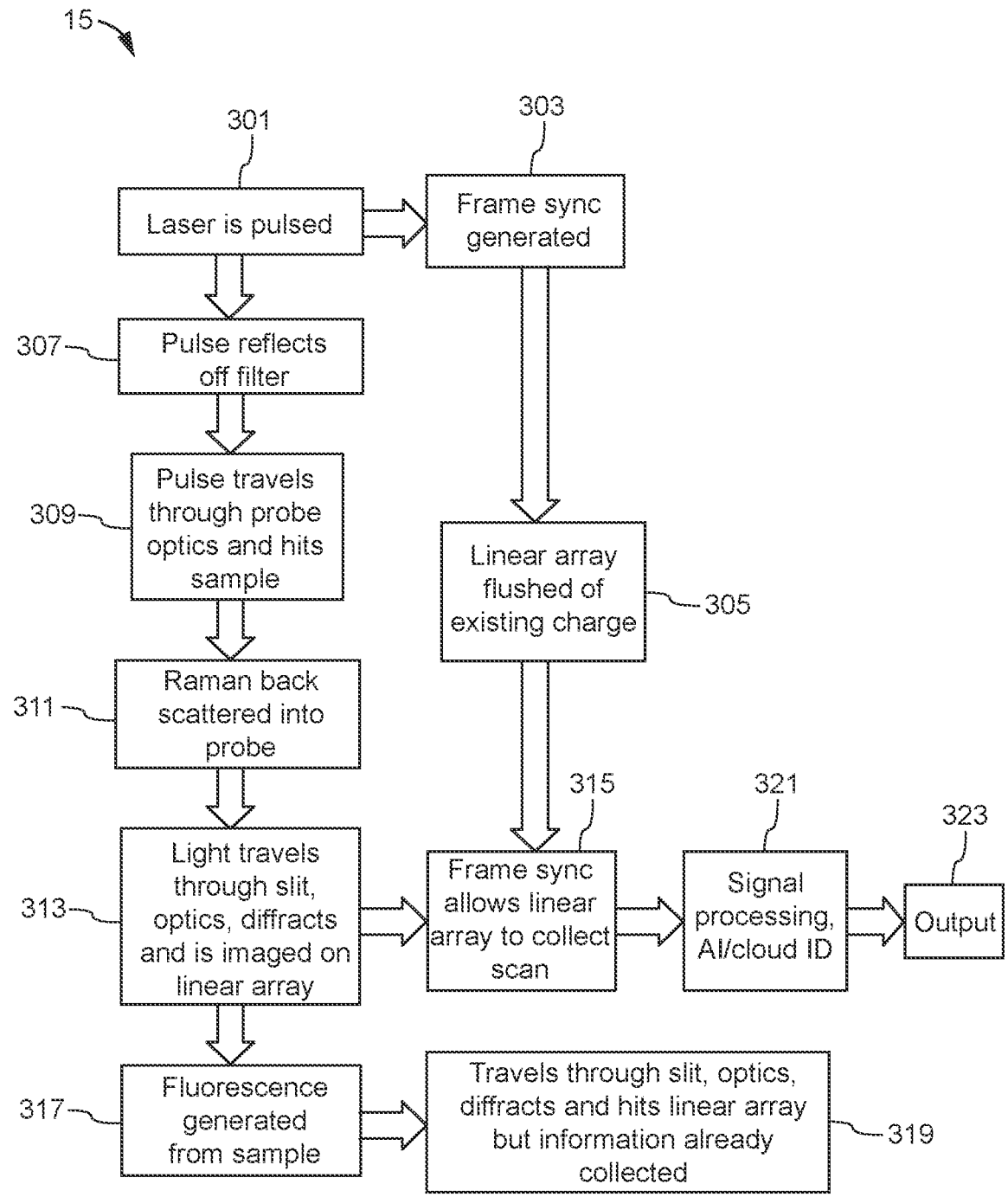
FIG. 3 illustrates schematically a functional approach for carrying out time-gated Raman spectroscopy.

The diagram 15 as shown in FIG. 3 illustrates a time-gated Raman spectroscopy process. The diagram 15 is also related to the setup of FIG. 5, which will be described further below in more detail.

As illustrated in 301 of FIG. 3, an optoelectronic laser is operated such as to provide laser pulses. The laser can be a low power (for example with an average power of 100 mW) DFB or DBR laser diode. A laser diode 9 is shown in FIG. 5.

Alternatively, a VCSEL and a green laser, such as a direct transition green laser, could be used to provide laser light. The VCSEL can for example be configured to emit light in the infrared.

A control signal (frame sync signal) 11 is generated in 303, which is used for controlling the operation of the laser 9. The signal 11 can also trigger the flashing of a detector array, for example, a linear array, from existing charges according to 305.

Regarding the generated laser pulse, it is reflected off the filter 2 (see FIG. 5) according to 307. In 309, the pulse travels through objective 1 and hits sample 215 (see also FIG. 5). Light which includes Raman light is back scattered and collected by the objective 1 according to 311 of FIG. 3.

The red-shifted Raman light passes the high pass filter 2, and lens 3 focuses the light through slit 4 into the spectrometer according to 313 of FIG. 3.

The Raman light further passes through collimation and aberration correction optics 5 and diffracting element 6 which spatially splits the Raman light into its spectral lines. At least some of the spectral lines in the Raman light are imaged by use of imaging lens 7 on the detector 8. A shutter 14 is placed in front of the detector 8 and the shutter 14 is operated based on the frame sync signal 11 by use of which the laser 9 is operated. As indicated in 315, the frame sync signal 11 allows the detector to collect the spectral lines of the Raman light by causing the opening of the shutter 14.

Fluorescence is generated by the sample according to 317 with a time delay with regard to the Raman light. Fluorescence light can arrive at the detector 8 according to 319, but data about the spectral lines in the Raman signal have already been collected due to the use of the frame sync signal as shown in 315 which has in the meantime closed the shutter 14. Thus, the detector 8 will not collect fluorescence light.

The data collected in 315 will be further processed in 312, for example by use of an artificial intelligence (AI) system or the like, in order to identify the spectral lines and/or the sample. A result is output in 323.

Figure 4:
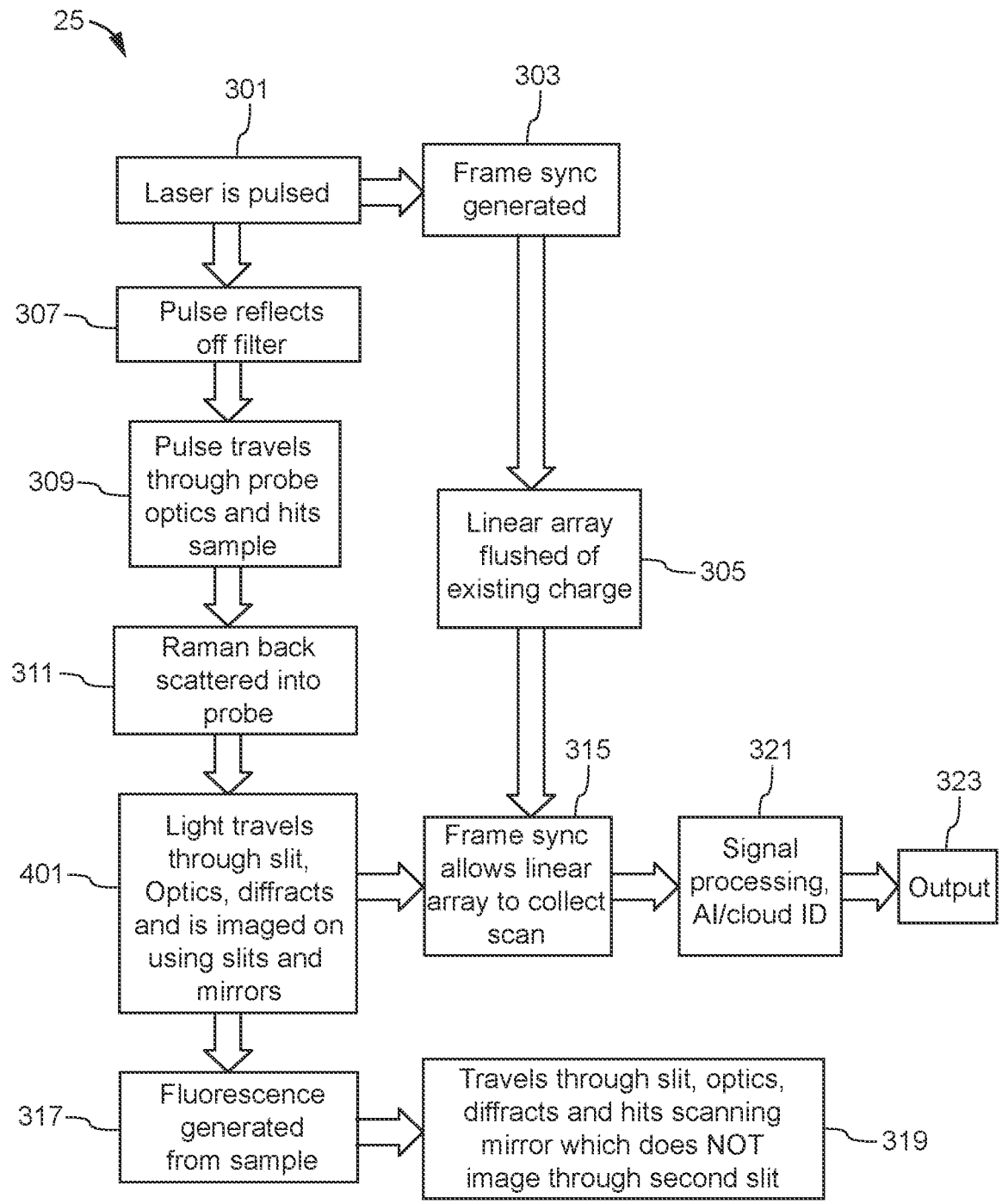
FIG. 4 illustrates schematically a further functional approach for carrying out time-gated Raman spectroscopy.

The diagram 25 as shown in FIG. 4 differs from the diagram 15 in FIG. 3 by block 401. Instead of using a shutter 14 (see FIG. 5), double slits 46 and 48 and a scanning mirror 47, for example a MEMS scanning mirror (MEMS=Micro-Electro-Mechanical System) are used, as illustrated in FIG. 6. The use of a MEMS scanning mirror 47 allows reduction of exposure time and prevents saturation of the linear array 8, trimming out the undesirable fluorescence in a different manner than shutter 14.

In some embodiments, this can be similar to tandem slit scanning microscopy. A tandem scanning slit microscope is for example described in the scientific publication by Stephen C. Baer "Tandem Scanning Slit Microscope", Proc. SPIE 1139, Optical Storage and Scanning Technology, (28 Sep. 1989); https://doi.org/10.1117/12.961780.

For example, in order to confine illumination to just the plane of focus, a tandem scanning mirror can be used similar to an epi-illumination tandem scanning pinhole microscope using slits instead. Epi-illumination is an operational mode used in microscopy in which illumination and detection occurs from the same side of the sample. The mirror image of one field aperture is coincident with the other, where an opaque mirror is used at the edge of the plane defined by the viewing slit and the center of the objective aperture. The mirror can then reflect light from the illuminated slit onto just one semicircle of the objective aperture. The remaining semicircle can be used for projecting light from the specimen to the viewing slit. Scanning can be accomplished by reciprocally rotating the two slits and the mirror. MEMS can be used to achieve rotating movements.

As further shown in diagram 35 of FIG. 5, the operation of optoelectronic laser 9 is controlled via GaN FET 10. The laser 9 comprises an anode A and a cathode C. The anode A is connected to a voltage supply provided by a voltage source (not shown). The cathode C is electrically connected to the drain D of transistor 10. The source S of transistor 10 is connected to ground gnd. The control signal (frame sync signal) 11 is applied to the gate of transistor 10. The control signal 10 can for example be a square-wave signal, and it can be configured to rapidly switch the electric current that drives the laser 9 between a level at which lasing occurs and a level at which the laser 9 is not emitting light.

The control signal 10 is provided to the shutter 14 to open and close the shutter 14 in dependence on the control signal 14. In the setup 45 of FIG. 6, the control signal 10 can be used to control the operation of the scanning mirror 47.

The laser 9 is turned on and off using the GaN FET 10, which can for example switch at dV/dt>100 V/s. For example, the laser 9 can have an approximate 8V forward bias, a turn on and off time of 160 ps is then possible. As the laser 9 can be a low power laser, it will not require a high voltage rail. The GaN FET 10 is well suited for these types of fast switching applications.

The generated pulses of the excitation radiation provided by the laser diode 9 is collimated using a lens 12, which can produce a Gaussian beam which is desirable for accurate Raman scattering analysis. The pulses of the excitation radiation are then condensed via objective 1, also referred to as probe optics, for example by using a common low f-number optics.

The pulses of laser light can be focused down to a spot size of approximately 20 microns to stimulate Raman scattering on the sample 215.

The backscattered light is mostly rejected at high pass filter 2, which can be a dichroic mirror, except the red-shifted component of the Raman scattered light. Thus, only the Stokes shifted light of the Raman light is further processed. The high pass filter 2 can start at the laser wavelength of the pulses as provided by laser 9, for example corresponding to a wavelength of 520 nm, 785 nm, 850 nm, or 940 nm.

Condensing lens 3 focuses the pulses of Raman light through slit 4 which determines the resolution of the system and optical throughput. For example, a 10-50 micron slit 4 is used to filter the signal. The pulses of Raman light pass through collimation and aberration correction optics 5, such as anachromat. The expanded and somewhat collimated pulses pass through diffracting element 6 which can be a 2D photonic crystal or a volume Bragg grating, and it acts as a wavelength separator.

Imaging lens 7 directs the first order of the spatially separated lines of the Raman light towards detector 8 while avoiding the zero order. The shutter 14 is used to prevent fluorescence light from saturating the detector 8 and the shutter 14 is operated based on the frame sync signal 11.

The now wavelength separated Raman light is imaged on detector 8, for example a linear array 8 such as a SiPM, SPAD, InGaAS detector, or cut filtered silicon with bias voltage applied.

The frame sync 11 can also be used to clear excess charges prior to Raman scattering being imaged on the detector 8.

The linear array 8 can be a deep well, large pixel (for example 8 um×8 um) linear array, and it can display an extremely tight form factor (8 mm×1 mm).

A temperature sensor or TEC 13 can be used to monitor the laser diode temperature to account for wavelength shift of laser diode 9.

Figure 7:
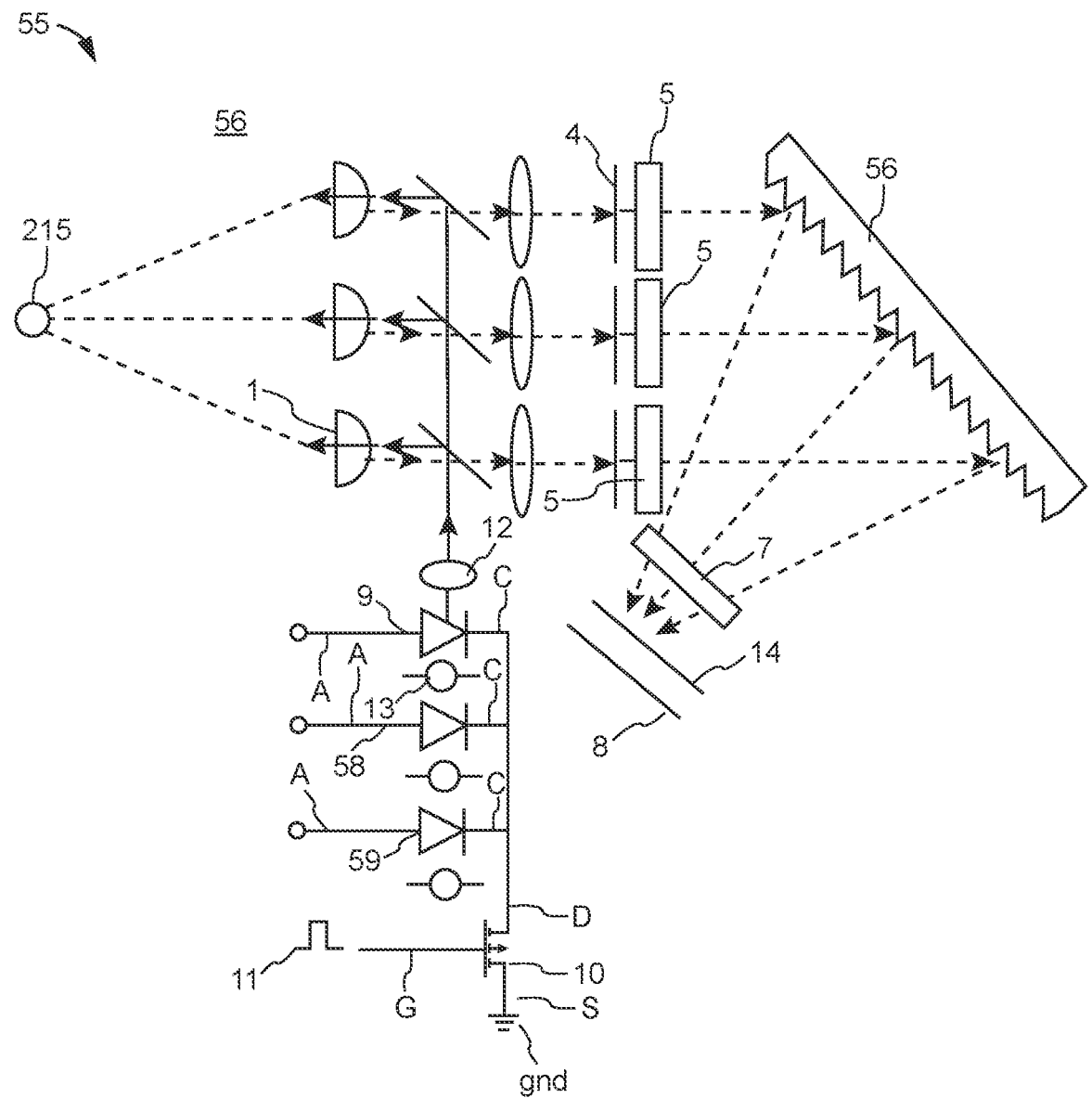
FIG. 7 shows schematically a further exemplary embodiment of an apparatus.

As shown in FIG. 7, the setup 55 provides multiple wavelengths of excitation radiation to sample 215. This can be realized by use of three lasers 9, 58, and 59, each of which provides laser pulses at a particular wavelength. Each laser 9, 58, and 59 is a laser diode and the cathode C of each laser diode is connected to the drain D of transistor 10.

The control signal 11 is applied to gate G of transistor 10 to control the electric current through the laser diodes 9, 58, and 59 and, thus, to switch the lasers 9, 58, and 59 on and off. The control signal 11 is also used to control the operation of the shutter 14.

A blazed diffraction grating 56 is further used to diffract any wavelength. For example, consider a 520 nm laser 9, a 785 nm laser 58, and an infrared laser 59 providing pulses at 1064 nm. The control signal 11 is again used along with a shutter 14 and linear array 8.

As an alternative to the diffraction grating 56, the Raman scattered light from the sample 215 under investigation can be split into its spectral lines by means of a prism or optical grating to fall onto a linear detector grid. The respective spectrum can be derived from the light intensity on each of the linearly aligned detector elements of detector 8.

In some alternative embodiments, the Raman light is directed to a sensor array, where each sensitive element or pixel is using a unique filter that only allows a specified narrow waveband to reach the sensor element. In this way, a diffraction element is not required. The number of pixels and the bandwidth of each corresponding filter in front of each pixel determine the spatial resolution of the detected spectrum.

Figure 8:
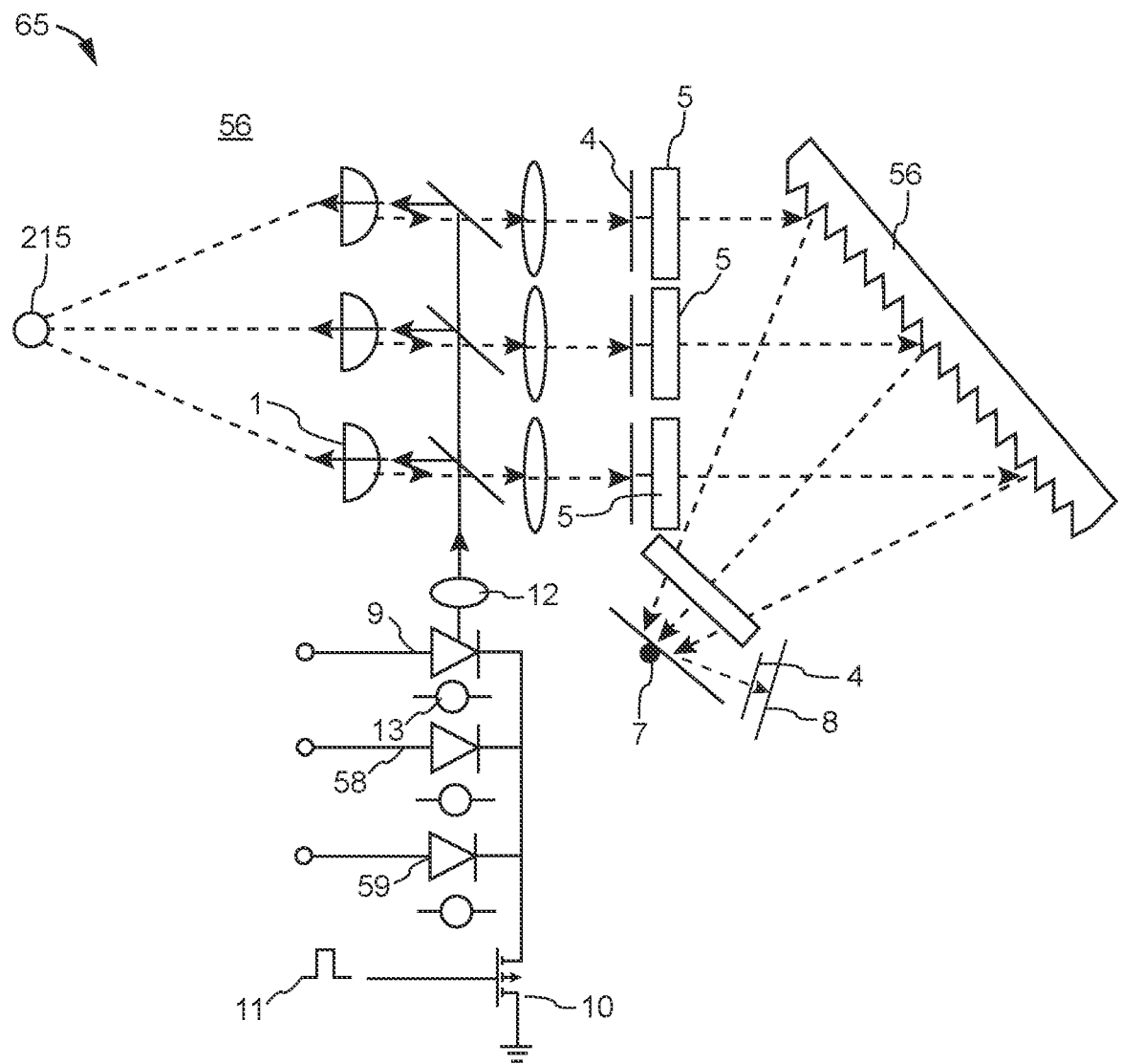
FIG. 8 shows schematically yet a further exemplary embodiment of an apparatus.

The setup 65 as shown in FIG. 8 includes double slits 46 and 48 as well as scanner 47 instead of the shutter 14 as used in setup 55 of FIG. 7. The control signal 11 is used to control operation of the scanner 47, which can be a scanning mirror or a MEMS scanning mirror. A multiplexing waveguide can also be utilized. The waveguide can be used for compactly combining multiple wavelengths such as those used, for example, in communication servers.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the techniques and their practical applications. Others skilled in the art are thereby enabled to best utilize the techniques and various embodiments with various modifications as are suited to the particular use contemplated.

The invention claimed is:

1. An apparatus comprising:
   at least one optoelectronic laser configured to provide excitation radiation to a sample, the excitation radiation being generated by an electric current flowing through the at least one optoelectronic laser;
   a transistor configured to modulate the electric current flowing through the at least one optoelectronic laser in order to switch on and off generation of the excitation radiation so that pulsed excitation radiation is provided; and
   a spectrometer configured to analyze Raman light scattered from the sample in response to exposing the sample to the pulsed excitation radiation,
   wherein a duration of the pulsed excitation radiation is fast enough to capture the Raman light prior to fluorescence,
   wherein the Raman light comprises one or more spectral components,
   wherein the spectrometer comprises a diffraction element configured to split the Raman light into the spectral components, and
   wherein the diffraction element comprises at least a photonic crystal or a plasmonic Fabry Perot filter.

2. The apparatus of claim 1, wherein the at least one optoelectronic laser is a DFB laser diode or DBR laser diode.

3. The apparatus of claim 1, wherein the transistor comprises an electric contact and the at least one optoelectronic laser comprises an electric contact, and wherein the electric contact of the transistor is directly electrically coupled to the electric contact of the at least one optoelectronic laser.

4. The apparatus of claim 1, wherein the transistor is a GaN FET configured to operate the at least one optoelectronic laser such as to generate the pulsed excitation radiation.

5. The apparatus of claim 1, wherein each pulse has a time duration of less than 200 ps.

6. The apparatus of claim 1, further comprising a temperature sensor configured to monitor a temperature of the at least one optoelectronic laser.

7. The apparatus of claim 1, further comprising a Bragg grating.

8. The apparatus of claim 1, further comprising a driver for the transistor, wherein the driver is configured to provide a control signal for controlling operation of the transistor.

9. The apparatus of claim 8, further comprising a shutter between the spectrometer and a detector configured to detect spectral lines in a Raman signal, wherein the spectrometer is configured to spatially split the spectral lines from the Raman signal, and wherein the shutter is operated based on the control signal.

10. The apparatus of claim 8, further comprising a scanning mirror between the spectrometer and a detector configured to detect spectral lines in a Raman signal, wherein the spectrometer is configured to spatially split the spectral lines from the Raman signal, and wherein the scanning mirror is operated based on the control signal.

11. A handheld electronic device comprising:
   a housing; and
   the apparatus according to claim 1,
   wherein the apparatus is arranged in the housing of the handheld electronic device.

12. The handheld electronic device of claim 11, wherein the handheld electronic device is a smartphone or a tablet.

13. A method for performing Raman spectroscopy on a sample, the method comprising:
   providing, by at least one optoelectronic laser of an apparatus, excitation radiation to the sample, the excitation radiation being generated by an electric current flowing through the at least one optoelectronic laser;
   modulating, by a transistor of the apparatus, the electric current flowing through the at least one optoelectronic laser in order to switch on and off generation of the excitation radiation so that pulsed excitation radiation is provided; and
   analyzing, by a spectrometer, Raman light scattered from the sample in response to exposing the sample to the pulsed excitation radiation,
   wherein a duration of the pulsed excitation radiation is fast enough to capture the Raman light prior to fluorescence,
   wherein the Raman light comprises one or more spectral components,
   wherein the spectrometer comprises a diffraction element for splitting the Raman light into the spectral components, and
   wherein the diffraction element comprises at least a photonic crystal or a plasmonic Fabry Perot filter.

14. An apparatus comprising:
   at least one DFB or DBR laser,
   a GaN FET configured to directly modulate the DFB or DBR laser for generating at least one laser pulse which is fast enough to capture Raman scatter prior to fluorescence; and a spectrometer configured to analyze the Raman scatter from a sample in response to exposing the sample to excitation radiation from the DFB or DBR laser, wherein the Raman scatter comprises one or more spectral components, wherein the spectrometer comprises a diffraction element configured to split Raman light into the spectral components, and wherein the diffraction element comprises at least a photonic crystal or a plasmonic Fabry Perot filter.

15. The apparatus of claim 14, further comprising tandem slits and/or MEMS mirrors configured to image while using a laser modulation signal as a frame sync.

16. An apparatus comprising:

at least one optoelectronic laser configured to provide excitation radiation to a sample, the excitation radiation being generated by an electric current flowing through the at least one optoelectronic laser;

a transistor configured to modulate the electric current flowing through the at least one optoelectronic laser in order to switch on and off the excitation radiation so that pulsed excitation radiation is provided;

a driver for the transistor, wherein the driver is configured to provide a control signal for controlling operation of the transistor; and a spectrometer and a detector configured to analyze Raman light scattered from the sample in response to exposing the sample to the pulsed excitation radiation, wherein a duration of the pulsed excitation radiation is fast enough to capture the Raman light prior to fluorescence, and wherein the detector is configured to be triggered to flush the detector from existing charges by the control signal.

17. The apparatus of claim 16, wherein the at least one optoelectronic laser is a DFB laser diode or DBR laser diode.

18. The apparatus of claim 16, wherein the transistor comprises an electric contact and the at least one optoelectronic laser comprises an electric contact, and wherein the electric contact of the transistor is directly coupled electrically to the electric contact of the at least one optoelectronic laser.

19. The apparatus of claim 16, wherein the transistor is a GaN FET.

20. The apparatus of claim 16, wherein the at least one optoelectronic laser is configured to generate pulses of excitation light, and wherein each pulse has a time duration of less than 200 ps.

21. The apparatus of claim 16, further comprising a temperature sensor configured to monitor a temperature of the at least one optoelectronic laser.

* * * * *